W. D. PETTIT.
SPRAYING NOZZLE.
APPLICATION FILED NOV. 26, 1912.
1,195,080.
Patented Aug. 15, 1916.
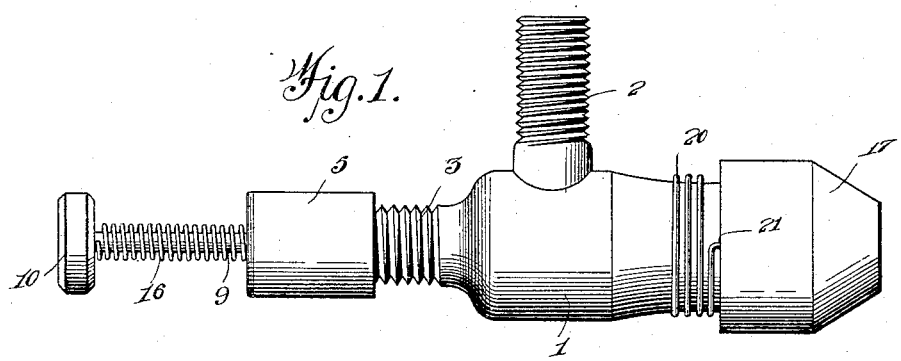
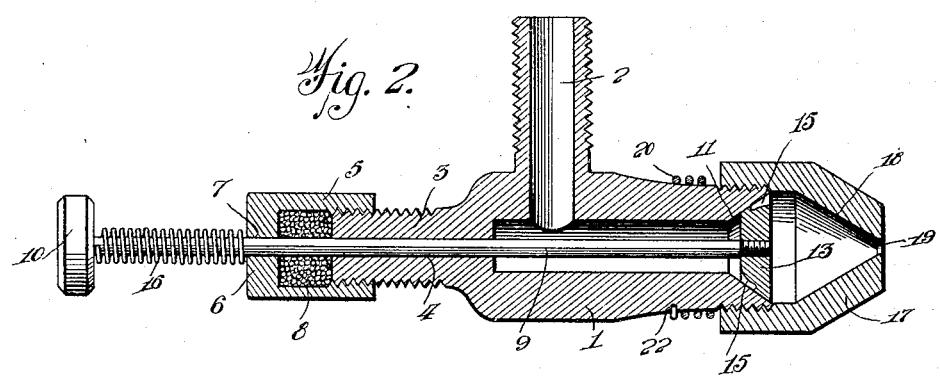
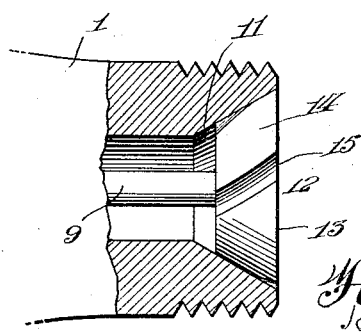
Inventor
Ward D. Pettit,
By Victor J. Evans
Attorney
Witnesses
Carroll Bailey,
John J. McCarthy

UNITED STATES PATENT OFFICE.

WARD D. PETTIT, OF BROWNVILLE, NEW YORK.

SPRAYING-NOZZLE.

1,195,080. Specification of Letters Patent. Patented Aug. 15, 1916.

Application filed November 26, 1912. Serial No. 733,648.

*To all whom it may concern:*

Be it known that I, WARD D. PETTIT, a citizen of the United States of America, residing at Brownville, in the county of Jefferson and State of New York, have invented new and useful Improvements in Spraying-Nozzles, of which the following is a specification.

This invention relates to improvements in spraying nozzles and has particular application to spraying nozzles designed for use in delivering insecticides and other liquids.

In carrying out the present invention, it is my purpose to provide a spraying nozzle which shall include a casing provided with a beveled end wall designed to form a valve seat, and a valve coöperative with the seat and consisting of a disk provided with a beveled peripheral wall adapted to snugly engage the seat and formed with a plurality of grooves having a helical pitch with respect to the center of the disk so that a whirling motion may be imparted to the liquid previous to its issuing from the spraying nozzle whereby the liquid may be discharged in the form of an even and finely divided spray.

With the above and other objects in view, the invention consists in the construction, combination and arrangement of parts hereinafter set forth in and falling within the scope of the appended claim.

In the accompanying drawing, Figure 1 is a side elevation of a spraying nozzle constructed in accordance with the present invention. Fig. 2 is a central sectional view of the same. Fig. 3 is an enlarged fragmentary view of the valve and its seat, and Fig. 4 is a detail perspective view of the valve.

Similar reference characters designate like parts throughout the several views.

In the accompanying drawing, the spraying nozzle in the present instance is designed to be hand operated, although it will be understood that the same may be attached to a vehicle distributer head if such is desired.

Referring to the drawing in detail, my improved spraying nozzle includes a housing or casing 1 provided with a lateral intake nipple 2 designed for connection with a suitable pressure device so that a liquid may be supplied to the casing under pressure. In the present instance, one end of the housing is reduced circumferentially to provide a threaded extension 3 having a longitudinal bore 4 in communication with the housing 1. Threaded onto the extension 3 is a nut 5 having a closed end 6 formed with an aperture 7 in alinement with the bore 4 of the extension 3, and within the nut 5 is disposed a packing 8 of any suitable or preferred material to prevent leakage around the parts.

In the present embodiment of the invention, a valve stem 9 is arranged within the casing and centrally thereof and extends outwardly of the casing through the alining bore and aperture of the extension 3 and nut 5 respectively. The projecting end of the stem 9 has threaded or otherwise secured thereto a manipulating disk 10 operable to move the valve stem longitudinally of the casing for a purpose to be presently described. The opposite end of the casing, as shown, has its end wall beveled inwardly to provide a valve seat 11 and coöperating with the seat 11 is a valve 12 threaded or otherwise suitably secured to the free end of the stem 9 within the housing. The valve 12 as illustrated comprises a disk 13 formed with a beveled peripheral wall 14 designed to snugly engage the seat 11 within the housing. Formed in the peripheral wall 14 of the disk are a plurality of grooves 15 having a helical pitch with respect to the center of the valve and the stem 9 so that the liquid passing between the valve and its seat may be given a whirling motion in order to produce an even and finely divided spray. A spring 16 encircles the stem 9 between the closed end 6 of the nut 5 and manipulating disk 10 and acts upon the stem to normally hold the valve in engagement with its seat so as to insure the proper motion being imparted to the liquid. In the event of grit or other foreign matter entering the grooves 15 in the valve or wedging between the valve and its seat, the manipulating disk 10 may be pressed inwardly and against the action of the spring 16 to disengage the valve from its seat thereby freeing the device of any foreign matter that may have been conveyed to the same with the liquid.

Threaded onto the valve end of the housing is a jet head 17 provided with an inner tapering wall 18 terminating in a discharge orifice 19 and of a gradually decreasing diameter from the valve toward the said orifice, whereby the whirling liquid issuing from the valve may be thrown around and within the chamber provided by the tapering wall 18 and discharged at a relatively high velocity from the orifice 19.

In carrying out my invention, I have found it desirable to lock the jet head to the casing in order to prevent accidental displacement of the jet head from the casing and to so lock the parts I have, in the present disclosure of the invention, employed an expansion spring 20 arranged concentrically about the valve end of the casing and exteriorly thereof, and having one end embedded in a recess 22 formed in this end of the casing and its opposite end engaged in a recess 21 formed in the under side of the peripheral wall of the jet head 17.

In use, the material to be sprayed is supplied to the casing 1 under pressure by way of the nipple 2, and is directed outwardly of the valve 12 and its seat 11, where the said liquid is given a whirling motion owing to the helical pitch of the grooves 15 with respect to the valve center, thence into the chamber provided by the tapering wall 18 and outwardly of the spraying orifice 19. Should the grooves 15 become clogged or should foreign matter enter between the valve and its seat, the valve stem may be moved longitudinally of the casing to disengage the valve from its seat and permit the discharge of such foreign matter from the jet head, the grooves 15 establishing communication at all times between the orifice 19 and the casing 1 irrespective of the position of the valve.

I claim:

In a device of the class described, in combination a housing, said housing at one end being formed with a longitudinal rod receiving channel, and at its opposite end with a longitudinal bore of greater diameter than and communicating with said rod receiving channel, said bore being flared at its outer end to form a conical valve seat, a rod passing through said channel and bore respectively, a frusto-conical valve adapted to extend into said conical seat with its outer face flush with the adjacent edge of the housing, said rod being secured to said valve, said rod projecting beyond the opposite end of said housing, a spring coiled around the projecting end of said rod, a knob secured to said rod and forming an abutment for said spring, said valve being formed with peripheral channels communicating with said bore, a jet head consisting of an inner cylindrical portion threaded upon the housing and having its inner surface extending in advance of said valve when in closed position, said jet head being contracted in diameter toward its outer end to form a conical spraying tube, the base of said conical portion limiting the movement of the valve from its seat and a supply pipe connected to said housing and communicating with said bore.

In testimony whereof I affix my signature in presence of two witnesses.

WARD D. PETTIT.

Witnesses:
ELIZABETH MOWRY,
MINNIE E. WITT.

Copies of this patent may be obtained for five cents each, by addressing the "Commissioner of Patents, Washington, D. C."